US010625723B2

(12) United States Patent
Masuda et al.

(10) Patent No.: US 10,625,723 B2
(45) Date of Patent: Apr. 21, 2020

(54) VEHICULAR BRAKE APPARATUS

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Yoshio Masuda, Anjo (JP); Daisuke Nakata, Seto (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 52 days.

(21) Appl. No.: 15/754,198

(22) PCT Filed: Aug. 25, 2016

(86) PCT No.: PCT/JP2016/074795
§ 371 (c)(1),
(2) Date: Feb. 21, 2018

(87) PCT Pub. No.: WO2017/033996
PCT Pub. Date: Mar. 2, 2017

(65) Prior Publication Data
US 2018/0244251 A1    Aug. 30, 2018

(30) Foreign Application Priority Data

Aug. 25, 2015    (JP) .................................. 2015-165515

(51) Int. Cl.
*B60T 8/40*    (2006.01)
*B60T 8/17*    (2006.01)
(Continued)

(52) U.S. Cl.
CPC ................ *B60T 8/409* (2013.01); *B60T 8/17* (2013.01); *B60T 8/4077* (2013.01);
(Continued)

(58) Field of Classification Search
CPC .......... B60T 8/409; B60T 8/17; B60T 8/4086; B60T 8/326; B60T 8/4077; B60T 13/58;
(Continued)

(56) References Cited

U.S. PATENT DOCUMENTS 3,827,242 A * 8/1974 Belart .................... B60T 13/146
60/552
4,834,468 A * 5/1989 Kuwana ................ B60T 8/4291
303/112

(Continued)

FOREIGN PATENT DOCUMENTS

JP    2001-199324 A    7/2001
JP    2013-209073 A    10/2013

OTHER PUBLICATIONS

International Search Report (PCT/ISA/210) dated Oct. 4, 2016, by the Japanese Patent Office as the International Searching Authority for International Application No. PCT/JP2016/074795.
(Continued)

*Primary Examiner* — Xuan Lan Nguyen
(74) *Attorney, Agent, or Firm* — Buchanan Ingersoll & Rooney PC

(57) ABSTRACT

Provided is a vehicular brake apparatus capable of suppressing the occurrence of pedal shock. In this vehicular brake apparatus, a master cylinder forms a second hydraulic chamber neighboring to a first hydraulic chamber through a seal member. The seal member is arranged at a position facing the first hydraulic chamber and the second hydraulic chamber to be movable in the axial direction relative to the master cylinder. A first hydraulic pressure generating portion executes a movement restriction hydraulic pressure control such that when the operation information obtained by the operation information obtaining portion indicates that the brake operating member is not operated, the first hydraulic pressure which is higher than the second hydraulic pressure (Continued)

is generated in advance and consecutively, the larger a value relating to an operating amount in the operation information obtained by the operation information obtaining portion, the higher the first hydraulic pressure is generated.

4 Claims, 6 Drawing Sheets

(51) Int. Cl.
  *B60T 11/236* (2006.01)
  *F16J 15/10* (2006.01)
  *B60T 13/14* (2006.01)
  *B60T 13/58* (2006.01)
  *B60T 8/32* (2006.01)

(52) U.S. Cl.
  CPC ........... *B60T 8/4086* (2013.01); *B60T 11/236* (2013.01); *B60T 13/145* (2013.01); *B60T 13/58* (2013.01); *F16J 15/10* (2013.01); *B60T 8/326* (2013.01); *B60T 2270/404* (2013.01); *B60T 2270/82* (2013.01)

(58) Field of Classification Search
  CPC .... B60T 13/662; B60T 13/686; B60T 13/146; B60T 7/042; B60T 11/236
  See application file for complete search history.

(56) References Cited

U.S. PATENT DOCUMENTS

| | | |
|---|---|---|
| 2002/0053206 A1 | 5/2002 | Oka et al. |
| 2013/0255249 A1 | 10/2013 | Maruyama et al. |
| 2015/0028664 A1* | 1/2015 | Choi ..................... B60T 8/4077 303/3 |
| 2015/0120161 A1* | 4/2015 | Kamiya .................. B60T 7/042 701/70 |

OTHER PUBLICATIONS

Written Opinion (PCT/ISA/237) dated Oct. 4, 2016, by the Japanese Patent Office as the International Searching Authority for International Application No. PCT/JP2016/074795.

* cited by examiner

SERVO CHAMBER 1A SIDE ←→ ONE SIDE HYDRAULIC PRESSURE CHAMBER 1B SIDE

FIRST PILOT CHAMBER

SERVO CHAMBER 1A SIDE ⟵⟶ ONE SIDE HYDRAULIC PRESSURE CHAMBER 1B SIDE

SERVO CHAMBER 1A SIDE ⟵⟶ ONE SIDE HYDRAULIC PRESSURE CHAMBER 1B SIDE

VEHICULAR BRAKE APPARATUS

TECHNICAL FIELD

This invention relates to a vehicular brake apparatus.

BACKGROUND ART

A master cylinder used in a vehicular brake apparatus is provided with a first hydraulic pressure chamber in which a hydraulic pressure is generated in response to the operation of a brake operating member and a second hydraulic pressure chamber where the hydraulic pressure therein increases or decreases mechanically responding to the operation of the brake operating member and the hydraulic pressure acts on the brake operating member by a force of the hydraulic pressure. The feeling generated upon depression of the brake operating member by an operator of the vehicle (for example, how the operator feels upon depression of a brake pedal) is influenced by the hydraulic pressure in the second hydraulic pressure chamber. Such vehicular brake apparatus is disclosed in for example, Japanese patent document 2013-209073 A.

CITATION LIST

Patent Literature

[Patent Literature 1] JP2013-209073 A

SUMMARY OF INVENTION

Technical Problem(s)

In such vehicular brake apparatus, if the hydraulic pressure in the second hydraulic pressure chamber (second hydraulic pressure) changes at an unexpected timing, the operator of the vehicle may receive an uncomfortable feeling upon brake operation. For example, if the hydraulic pressure in the second hydraulic pressure chamber increases at an unexpected timing, the brake operating member (for example, brake pedal) is pushed back to the operator side, which may lead to generation of a pedal shock. The inventors of this application focused on a sealing member provided between the first and the second hydraulic pressure chambers to define the two chambers therebetween so that any possible pedal shock generation may be decreased and discovered a new issue on this matter.

According to the conventional structure, for example, a time period when the second hydraulic pressure becomes higher than the first hydraulic pressure (hydraulic pressure in the first hydraulic pressure chamber) may occur in an early time of brake operation. Due to this occurrence of time period, the sealing member, if such sealing member is displaceable, is displaced (shifted) towards the first hydraulic pressure chamber side. Then, upon the time when the first hydraulic pressure becomes higher than the second hydraulic pressure chamber in an afterward brake operation, the sealing member is displaced towards the second hydraulic pressure chamber side. This displacement of the sealing member towards the second hydraulic pressure chamber side makes the volume of the second hydraulic pressure chamber to be decreased to raise the second hydraulic pressure therein. In other words, occurrence of displacement of the sealing member towards the second hydraulic pressure chamber side during the brake operation may increase the second hydraulic pressure to generate possible pedal shock phenomenon.

Accordingly, this invention was made in consideration with the above-mentioned situation and the objective of the invention is to provide a vehicular brake apparatus which can suppress occurrence of a pedal shock.

Solution to Problem(s)

The vehicular brake apparatus according to the invention includes a hydraulic pressure output portion which includes a master cylinder forming a first hydraulic pressure chamber and a piston which is driven by a force corresponding to a first hydraulic pressure which is a hydraulic pressure in the first hydraulic pressure chamber to be slidably movable in the master cylinder, thereby to output an output hydraulic pressure which is a hydraulic pressure corresponding to a stroke of the piston, an operation information obtaining portion which obtains an operation information relating to an operation of a brake operating member and a first hydraulic pressure generating portion which generates the first hydraulic pressure in response to the operation information obtained by the operation information obtaining portion, wherein a braking force is generated at a wheel of a vehicle based on the output hydraulic pressure. The master cylinder forms a second hydraulic pressure chamber neighboring to the first hydraulic pressure chamber through a sealing member and the sealing member is arranged at a position facing the first hydraulic pressure chamber and the second hydraulic pressure chamber to be movable in an axial direction relative to the master cylinder. The second hydraulic pressure chamber is configured such that a second hydraulic pressure which is a hydraulic pressure in the second hydraulic pressure chamber is mechanically increased or decreased in response to the operation of the brake operating member and at the same time a force corresponding to the second hydraulic pressure acts on the brake operating member. The first hydraulic pressure generating portion is configured to execute a movement restriction hydraulic pressure control such that when the operation information obtained by the operation information obtaining portion indicates that the brake operating member is not operated, the first hydraulic pressure which is higher than the second hydraulic pressure is generated in advance and consecutively, the larger a value relating to an operating amount in the operation information obtained by the operation information obtaining portion, the higher the first hydraulic pressure is generated.

Effect of Invention

According to the vehicular brake apparatus of the invention, by executing the movement restriction hydraulic pressure control, the first hydraulic pressure becomes higher than the second hydraulic pressure before the brake operating member is operated. Therefore, the sealing member moves towards the second hydraulic pressure chamber side in advance. Or the movement of the sealing member towards the first hydraulic pressure side is prevented. Further, by executing the movement restriction hydraulic pressure control, the first hydraulic pressure becomes higher thereafter in response to the brake operation to maintain the state that the movement of the sealing member towards the first hydraulic pressure chamber side is restricted continuously during the brake operation. In other words, the vehicular brake apparatus according to the invention can restrict the movement of the sealing member (movement of the sealing member towards the second hydraulic pressure chamber side after the movement of thereof towards the first hydraulic pressure chamber side) during brake operation to thereby prevent occurrence of pedal shock.

BRIEF EXPLANATION OF ATTACHED DRAWINGS

EMBODIMENTS FOR IMPLEMENTING INVENTION

Figure 1:
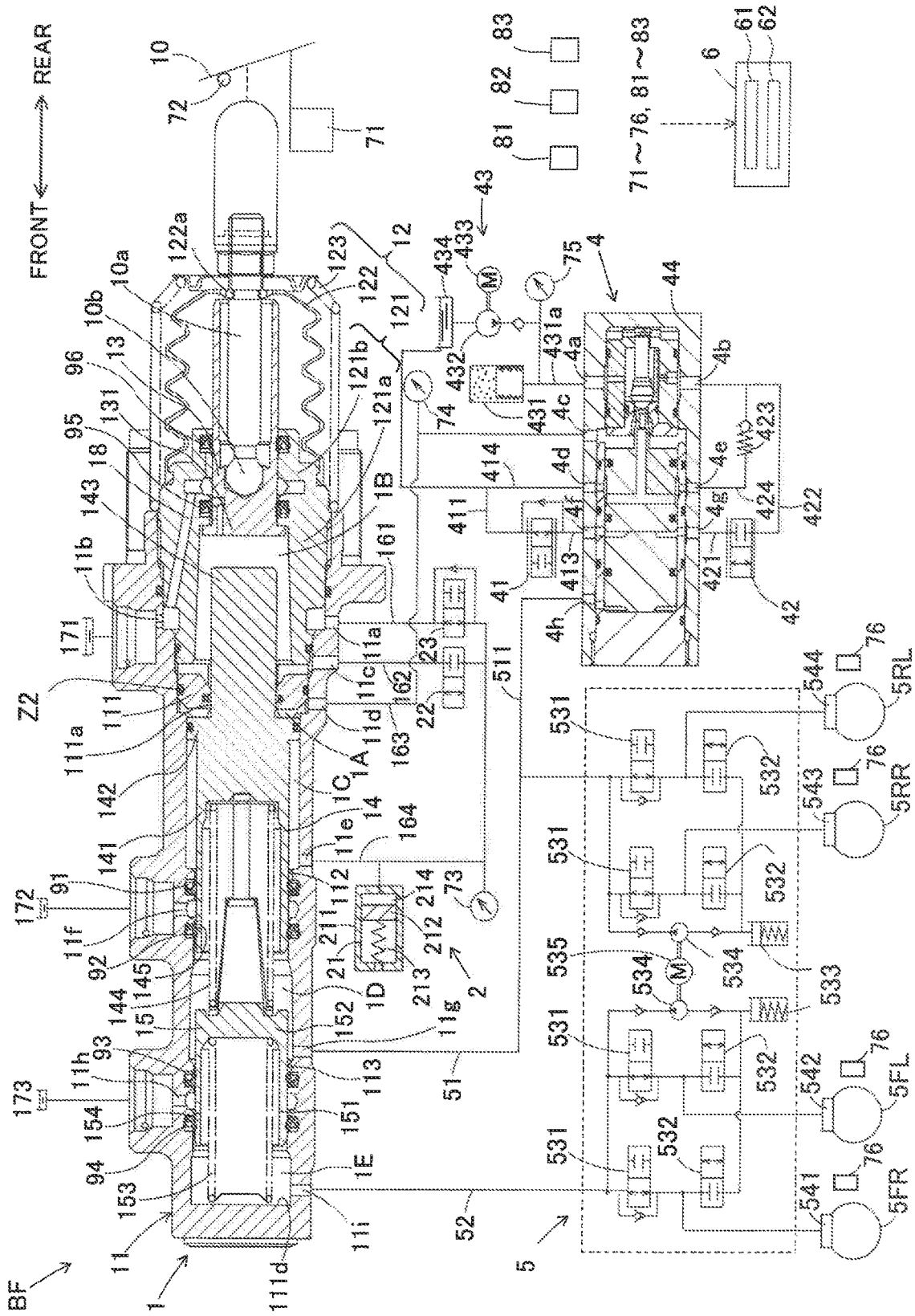
FIG. 1 is a structural view of the vehicular brake apparatus according to an embodiment of the invention.

The embodiments of the invention will be explained hereinafter with reference to the attached drawings. It is noted that each drawing used for explanation shows a conceptual drawing and the shape of each portion in the drawings does not necessarily indicate an accurate shape in practical use. As shown in FIG. 1, the vehicular brake apparatus according to a first embodiment of the invention is formed by a hydraulic pressure braking force generating device BF which generates a hydraulic pressure braking force at vehicle wheels 5FR, 5FL, 5RR and 5RL and a brake ECU 6 which controls the hydraulic pressure braking force generating device BF.

(Hydraulic Pressure Braking Force Generating Device BF)

The hydraulic pressure braking force generating device BF is formed as shown in FIG. 1, by a master cylinder 1, a reaction force generating device 2, a first control valve 22, a second control valve 23, a servo pressure generating device 4, an actuator 5, wheel cylinders 541 through 544 and various sensors 71 through 76. The master cylinder 1 and the servo pressure generating device 4 correspond to the "hydraulic pressure output portion".

(Master Cylinder 1)

The master cylinder 1 is a portion which supplies the actuator 5 with an operating fluid in response to the operating amount of a brake pedal 10 (corresponding to the "brake operating member") and is formed by a main cylinder 11, a cover cylinder 12, an input piston 13, a first master piston 14 (corresponding to the "piston") and a second master piston 15 (corresponding to the "piston") and so on. The brake pedal 10 may be of any type of brake operating means that can perform brake operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion in front and rearward direction. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than the inner diameter of the front portion 121a.

The dust prevention purpose boots 122 is of tubular bellow shaped and is extendible or compressible in front and rearward directions. The front side of the boots 122 is assembled to be in contact with the rear end side opening of the cylindrical portion 121. A through hole 122a is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111a of the inner wall portion 111. The rear end of the projection portion 143 projects into an inner space of the cylindrical portion 121, passing through the through hole 111a and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located at a surrounding of the rear end portion and rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The front-end portion and the rear end portion of the flange portion 142 of the first master piston 14 separate the rear chamber into a front portion and a rear portion and "the other side hydraulic pressure chamber" (corresponding to the "second hydraulic pressure chamber") 1C" is defined in the rear chamber at the front side thereof a "servo chamber (corresponding to the "first hydraulic pressure chamber") 1A" is defined in the rear chamber at the rear side thereof. The volume of the other side hydraulic pressure chamber 1C decreases by the advance movement of the first master piston 14 and increases by the retreatment of the first master piston 14. Further, "one side hydraulic pressure chamber (corresponding to the second hydraulic pressure chamber" 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Figure 2:
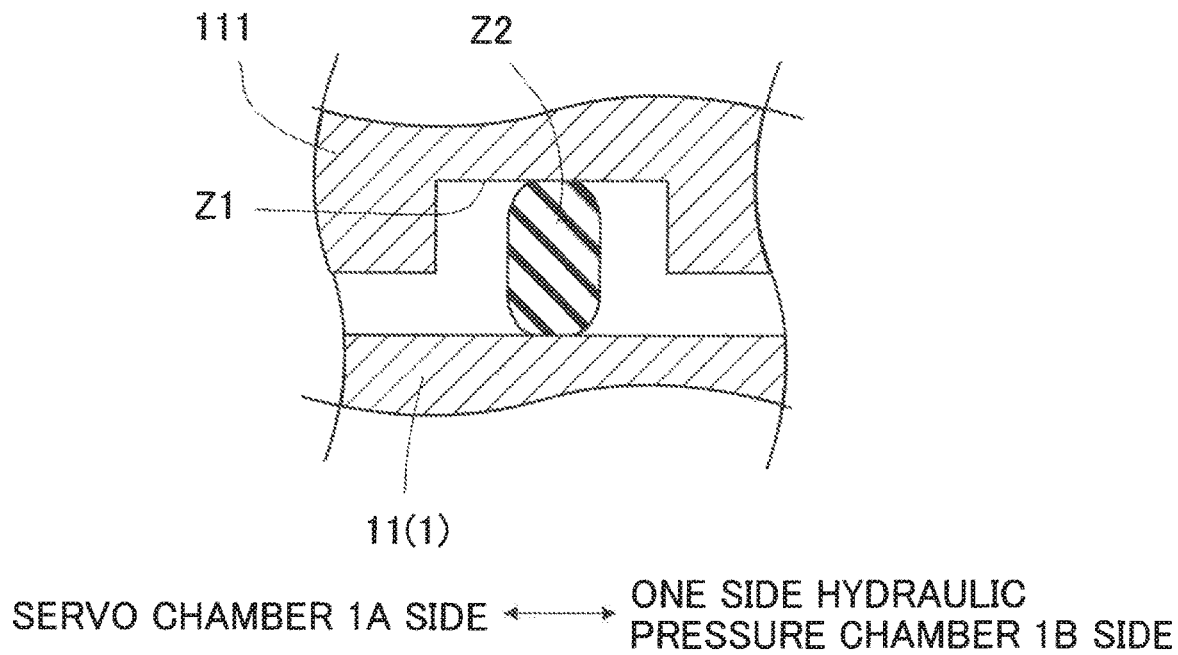
FIG. 2 is a conceptual view for explaining a structure of a sealing member according to the embodiment.

In other words, the master cylinder 1 forms therein the servo chamber 1A, the one side hydraulic pressure chamber 1B which is located adjacent to the servo chamber 1A in a rearward direction (axial direction), the other side hydraulic pressure chamber 1C which is located adjacent to the servo chamber 1A at the front side, the first master chamber 1D and the second master chamber 1E. Further, a recessed portion Z1 formed in an annular groove shape is formed at the outer peripheral surface of the inner wall portion 111 as shown in FIG. 2. An annular shaped sealing member Z2 is fitted into the recessed portion Z1. In other words, the master cylinder 1 has the sealing member Z2 which seals the space between the servo chamber 1A and the one side hydraulic pressure chamber 1B. The sealing member Z2 is of a cup-shaped sealing member and is provided between the servo chamber 1A and the one side hydraulic pressure chamber 1B, I.e., the master cylinder 1 forms the one side hydraulic pressure chamber 1B which is neighboring to the servo chamber 1A via the sealing member Z2. The sealing member Z2 is arranged at a position facing the servo chamber 1A and the one side hydraulic pressure chamber 1B. The sealing member Z2 is movably disposed in the recessed portion Z1 in a front/rear direction (in an axial direction relative to the master cylinder 1). In other words, the width of the sealing member Z2 in the front/rear direction is set to be smaller than the width of the recessed portion Z1 in the front/rear direction. As explained, the master cylinder 1 includes the sealing member Z2 which partitions the servo chamber 1A and the one side hydraulic pressure chamber 1B and is movable in an axial direction relative to the master cylinder 1. It is noted that FIG. 2 indicates a conceptual enlarged view of the sealing member Z2 shown in FIG. 1.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171 (low pressure source).

The port 11b is in communication with the one side hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the one side hydraulic pressure chamber 1B and the reservoir 171 is interrupted.

The port 11c is formed at a location rearward of the inner wall portion 111 and forward of the port 11a and the port 11c connects the one side hydraulic pressure chamber 1B with a conduit 162. The port 11d is formed at a location forward of the port 11c and connects the servo chamber 1A with a conduit 163. The port 11e is formed at a location forward of the port 11d and connects the other side hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

The stroke sensor 71 is a sensor which detects the operating amount (stroke) of the brake pedal 10 operated by a driver of the vehicle and transmits the detected result to the brake ECU 6. The brake stop switch 72 is a switch which detects whether the brake pedal 10 is depressed or not, using a binary signal and the detected signal is sent to the brake ECU 6.

(Reaction Force Generating Device 2)

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the one side hydraulic pressure chamber 1B and the other side hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the backward side direction by a compression spring 213 and a reaction force hydraulic pressure chamber 214 is formed at a location backward side of the piston 212. The reaction force hydraulic pressure chamber 214 is connected to the other side hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing operations thereof are controlled by the brake ECU 6. The first control valve 22 is disposed between the conduit 164 and the conduit 162 for communication therebetween. The conduit 164 is connected to the other side hydraulic pressure chamber 1C via the port 11e and the conduit 162 is connected to the one side hydraulic pressure chamber 1B via the port 11c. The one side hydraulic pressure chamber 1B becomes in open state when the first control valve 22 opens and becomes in closed state when the first control valve 22 closes. Accordingly, the conduits 164 and 162 are formed for establishing fluid communication between the one side hydraulic pressure chamber 1B and the other side hydraulic pressure chamber 1C.

The first control valve 22 is closed under non-energized state where an electricity is not applied and under this state, communication between the one side hydraulic pressure chamber 1B and the other side hydraulic pressure chamber 1C is interrupted. Due to the closure of the one side hydraulic pressure chamber 1B, the operating fluid is nowhere to flow and the input piston 13 and the first master piston 14 are moved integrally keeping a constant separation distance therebetween. The first control valve 22 is open under the energized state where an electricity is applied and under such state, the communication between the one side hydraulic pressure chamber 1B and the other side hydraulic pressure chamber 1C is established. Thus, the volume changes in the one side hydraulic pressure chamber 1B and the other side hydraulic pressure chamber 1C due to the advancement and retreatment of the first master piston 14 can be absorbed by the transferring of the operating fluid.

The pressure sensor 73 is a sensor which detects the reaction force hydraulic pressure (corresponding to the "second hydraulic pressure") of the other side hydraulic pressure chamber 1C and the one side hydraulic pressure chamber 1B and is connected to the conduit 164. The pressure sensor 73 detects the pressure of the other side hydraulic pressure chamber 1C while the first control valve 22 is in a closed state and also detects the pressure of the one side hydraulic pressure chamber 1B while the first control valve 22 is in an open state. The pressure sensor 73 sends the detected signal to the brake ECU 6. The stroke sensor 71, the brake stop switch 72 and/or the pressure sensor 73 may form an operation information obtaining portion which obtains the operation information on the operation of the brake pedal 10.

(Second Control Valve 23)

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the other side hydraulic pressure chamber 1C via the port 11e and the conduit 161 is in communication with the reservoir 171 via the port 11a. Accordingly, the second control valve 23 establishes the communication between the other side hydraulic pressure chamber 1C and the reservoir 171 under the non-energized state thereby generating no reaction force hydraulic pressure but the second control valve 23 interrupts the communication therebetween under the energized state thereby generating the reaction force hydraulic pressure. Thus, the master cylinder 1 (one side hydraulic pressure chamber 1B) is structured such that the reaction force hydraulic pressure which is the hydraulic pressure in the one side hydraulic pressure chamber 1B increases or decreases in response to the operation of the brake pedal 10 and a force corresponding to the reaction force hydraulic pressure acts on the brake pedal 10.

(Servo Pressure Generating Device 4)

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state (normally open valve) and the flow-rate (or, the pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and ports 11a and 11b. The pressure decreasing valve 41 prevents the operating fluid from flowing out of the later explained first pilot chamber 4D by closing. It is noted here that the reservoir 171 and the reservoir 434 are in fluid communication with each other through a connecting route (not shown). Further, as another alternative, a reservoir common to both of the reservoir 171 and the reservoir 434 may be used.

The pressure increasing valve 42 is an electromagnetic valve structured to close under a non-energized state (normally closed valve) and the flow-rate (or pressure) thereof is controlled by the brake ECU 6. One end of the pressure increasing valve 42 is connected to the conduit 421 and the other end thereof is connected to the conduit 422.

Figure 3:
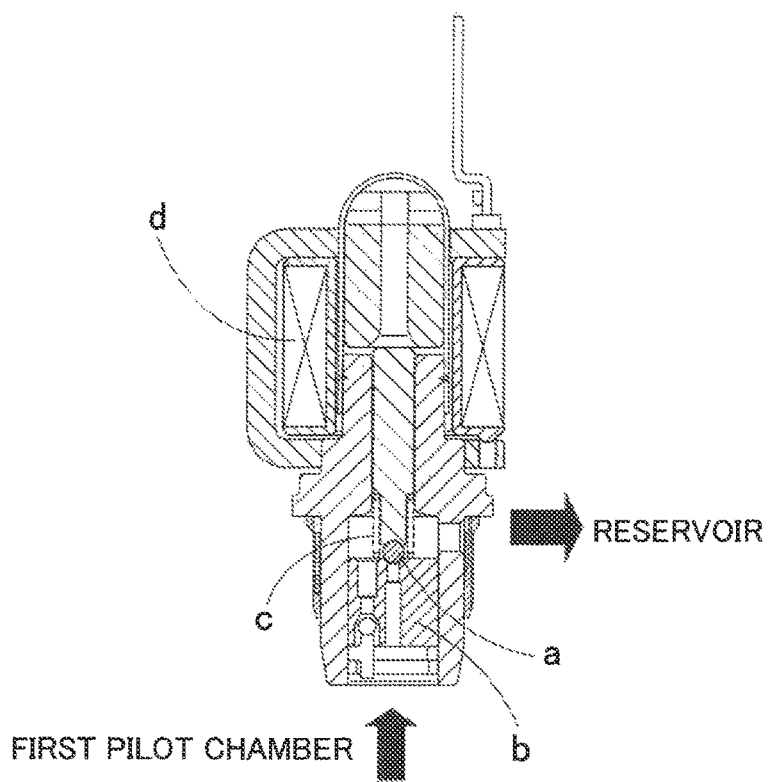
FIG. 3 is a conceptual view of an example of an electromagnetic valve.

One example of a normally open type electromagnetic valve which is used for the pressure decreasing valve 41 will be schematically explained hereinafter. As shown in FIG. 3, the electromagnetic valve (pressure decreasing valve 41) is formed by a valve member "a", a valve seat "b", a spring "c" which biases the valve member "a" in a valve opening direction (in a direction where the valve member "a" is separated from the valve seat "b"), and a coil (solenoid) "d" which generates an electromagnetic driving force for pushing the valve member "a" in a valve closing direction when energized. When a current flowing through the coil "d" is less than a valve closing current, the valve member "a" and the valve seat "b" are separated from each other by the biasing force of the spring "c" and the electromagnetic valve is in a valve open state. However, when a current flowing through the coil "d" is equal to or more than the valve closing current, the valve member "a" is brought into contact with the valve seat "b" by the electromagnetic driving force, which is generated at the coil "d" to push the valve member "a" in the valve closing direction. The electromagnetic driving force becomes larger than the sum of the biasing force of the spring "c" and a pressure differential operation force generated by the pressure difference between an inlet side and an outlet side of the electromagnetic valve when the current flowing through the coil "d" is equal to or more than the valve closing current and the electromagnetic valve is closed. The value of the valve closing current (minimum control current which can close the valve) is decided by the pressure difference between the inlet side and the outlet side of the electromagnetic valve.

As explained, the opening and closing operations of the pressure decreasing valve 41 and the pressure increasing valve 42 are decided by a force balance among the electromagnetic driving force which is generated by the current flowing through the coil "d", the biasing force of the spring "c" and the pressure differential operation force generated by the pressure difference between the inlet side and the outlet side of the electromagnetic valve and are controlled by the current (control current) supplied to the coil "d". It is noted here that the direction of biasing force of the spring and the direction of the electromagnetic driving force are decided according to the structure of the electromagnetic valve (normally open type or normally closed type and so on).

The pressure supplying portion 43 is a portion for supplying the regulator 44 mainly with a highly pressurized operating fluid. The pressure supplying portion 43 includes an accumulator 431 (high-pressure source), a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the operating fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the operating fluid to the accumulator 431 in order to recover a pressure up to the value equal to or more than the predetermined value.

Figure 4:
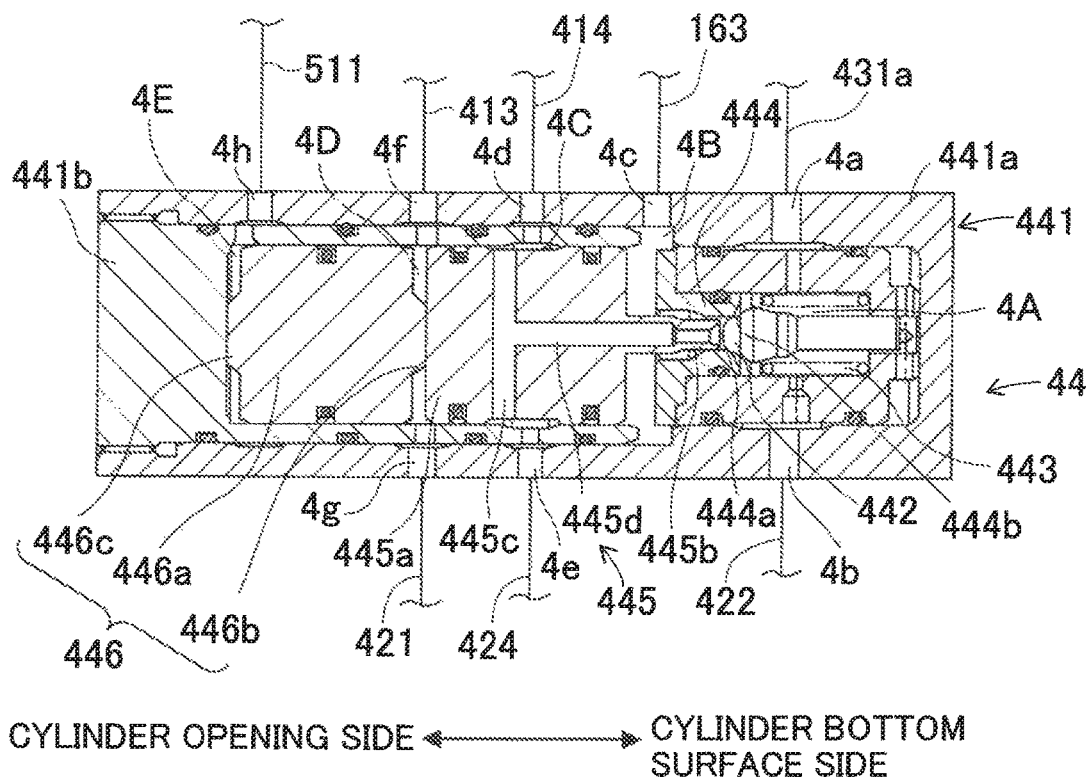
FIG. 4 is a cross sectional view of a regulator according to the embodiment.

The regulator 44 includes a cylinder 441, a ball valve 442, a biasing portion 443, a valve seat portion 444, a control piston 445 and a sub-piston 446 and so forth as shown in FIG. 4. The cylinder 441 includes a cylinder case 441a formed in a substantially bottomed cylinder-shape having a bottom surface at one end thereof (at the right side in the drawing) and a cover member 441b closing an opening of the cylinder case 441a (at the left side thereof in the drawing). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4a through 4h provided on the cylinder 441.

The port 4a is connected to the conduit 431a. The port 4b is connected to the conduit 422. The port 4c is connected to a conduit 163. The conduit 163 connects the servo chamber 1A and the outlet port 4c. The port 4d is connected to the reservoir 434 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51. It is noted that the conduit 414 may be connected to the conduit 161.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C in a state where the projection portion 445b and the ball valve 442 are not in contact with each other.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction. A damper mechanism may be provided at an end portion of the cylinder bottom surface side of the sub piston 446.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder bottom surface side of the control piston 445. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in fluid communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure (corresponding to the "first hydraulic pressure") to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pressure (referred to also as "pilot pressure") in the first pilot chamber 4D and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing. In other words, the regulator 44 is structured so that the flowing amount of the liquid flows into or out of the servo chamber 1A in response to the pressure difference between the pilot pressure and the servo pressure.

(Actuator 5)

The actuator 5 is provided between the first master chamber 1D and the second master chamber 1E which generate the master cylinder hydraulic pressure (corresponding to the "output hydraulic pressure") and the wheel cylinders 541 through 544. The actuator 5 and the first master chamber 1D are in communication through the conduit 51 and the actuator 5 and the second master chamber 1E are in communication through the conduit 52. The actuator 5 adjusts the brake hydraulic pressure to be supplied to the wheel cylinders 541 through 544 based on the instructions from the brake ECU 6. The actuator 5 according to the embodiment forms an anti-lock brake system (ABS) that prevents wheels from locking during braking. The actuator 5 is conceptually formed by the ABS which includes at least a reservoir 533 from which the operating fluid in the wheel cylinders 541 through 544 is discharged, an inlet valve (corresponding to the later explained holding valve 531) provided between the master chambers 1D and 1E and the wheel cylinders 541 through 544 and an outlet valve (corresponding to the later explained pressure decreasing valve 532) provided between the wheel cylinders 541 through 544 and the reservoir 533. The actuator 5 is formed with four channel system corresponding to the respective wheel cylinders 541 through 544. Each structure of the four channels is formed same to one another and one channel will be explained hereinafter and the explanation of the remaining three channels will be omitted.

The actuator 5 (first channel) corresponding to the wheel cylinder 544 is formed by a holding valve 531, a pressure decreasing valve 532, a reservoir 533, a pump 534 and a motor 535. The holding valve 531 is an electromagnetic valve disposed between the first master chamber 1D and the wheel cylinder 544. First opening of the holding valve 531 is connected to the conduit 51 and the second opening of the holding valve 531 is connected to the wheel cylinder 544 and a first opening of the pressure decreasing valve 532. The holding valve 531 is an electromagnetic valve which generates a pressure differential between the both openings and is a normally open valve which becomes an open state under non-energized state. The communication state of the holding valve 531 is switched over between the two states, one being a communication state in which the both openings are in communication (non-pressure differential state) and the other being a pressure differential state in which a pressure difference is generated between the two openings by the brake ECU 6. The pressure decreasing valve 532 is disposed between the wheel cylinder 544 and the reservoir 533. The pressure decreasing valve 532 establishes or interrupts the fluid communication between the wheel cylinder 544 and the reservoir 533 in response to the instructions from the brake ECU 6. The pressure decreasing valve 532 is a normally close type valve which is in a closed state under a non-energized state.

The reservoir 533 has a hydraulic pressure chamber which reserves the operating fluid therein. The opening of the reservoir 533 is connected to the second opening of the pressure decreasing valve 532 and the pump 534 via the conduit. The pump 534 is driven by the motor 535 and returns the operating fluid in the reservoir 533 to the master cylinder 1 side. The motor 535 is driven in response to the instructions from the brake ECU 6.

The function of the actuator 5 will be briefly explained hereinafter. When both of the holding valves 531 and the pressure decreasing valve 532 are in non-energized state (normal braking state), the holding valve 531 is in a valve opening state and the pressure decreasing valve 532 is in valve closed state. Therefore, the master chambers 1D and 1E are in communication with the wheel cylinders 541 through 544. Under such state, the wheel pressure which corresponds to the hydraulic pressure in the wheel cylinders 541 through 544 is controlled (pressure increase control) in response to the brake operation. Further, when the control current of the holding valve 531 is controlled, maintaining the pressure decreasing valve 532 to be in the closed state, the wheel pressure is controlled to be increased in response to the control of the holding valve 531. Further, when the holding valve 531 is in the energized state and the pressure decreasing valve 532 is in non-energized state (valve closed state), the wheel pressure is maintained. In other words, in such state, the wheel pressure is controlled to be held. When both of the holding valve 531 and the pressure decreasing valve 532 are in the energized state, the communication between the wheel cylinders 541 through 544 and the reservoir 533 is established to control the wheel pressure to be decreased. By such pressure holding and decreasing controls, the wheel cylinder pressure is controlled not to lock the rotation of wheels of the vehicle. The adjustment of the wheel pressure by the actuator 5 is independently performed for respective wheel cylinders 541 through 544 depending on the situation.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication. The brake ECU 6 is connected to the various sensors 71 through 76 for controlling each of the electromagnetic valves 22, 23, 41 and 42, the motor 433 and the actuator 5 and so on. The operating amount (stroke amount) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, the hydraulic pressure of the other side hydraulic pressure chamber 1C or the hydraulic pressure of the one side hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR, 5FL, 5RR and 5RL is inputted to the brake ECU 6 from each of the wheel speed sensors 76. Further, the acceleration information, shifting information and ON/OFF information on parking brake 83 are inputted to the brake ECU 6.

(Brake Control)

The brake control by the brake ECU 6 will be explained hereinafter. The brake control is a normal control of hydraulic pressure braking force. In other words, the brake ECU 6 energizes the first control valve 22 and opens the first control valve 22 and energizes the second control valve 23 and closes the second control valve 23. By this closing of the second control valve 23, the communication between the other side hydraulic pressure chamber 1C and the reservoir 171 is interrupted and by the opening of the first control valve 22, the communication between the one side hydraulic pressure chamber 1B and the other side hydraulic pressure chamber 1C is established. Thus, the brake control is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be a valve device which adjusts the flow-rate of the operating fluid which flows into or out of the first pilot chamber 4D. Under this brake control, the brake ECU 6 calculates a required braking force required by the operator of the vehicle based on the operating amount of the brake pedal 10 detected by the stroke sensor 71 (displacement amount of the input piston 13) or the operation force of the brake pedal 10 (for example, the hydraulic pressure detected at the pressure sensor 73). Then, based on the calculated required braking force, a target servo pressure is set. The pressure decreasing valve 41 and the pressure increasing valve 42 are controlled so that the actual servo pressure, which is the servo pressure detected at the pressure sensor 74 approximates the target servo pressure.

In more detail, under the state that the brake pedal 10 is not depressed, the brake control becomes the state as explained above, i.e., becomes the state that the ball valve 442 closes the through-passage 444a of the valve seat portion 444. Under this state, the pressure decreasing valve 41 is in an open state and the pressure increasing valve 42 is in a closed state. In other words, the fluid communication between the first chamber 4A and the second chamber 4B is interrupted. The second chamber 4B is in communication with the servo chamber 1A via the conduit 163 to keep the hydraulic pressures in the two chambers 4B and 1A to be mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the second pilot chamber 4E and first master chamber 1D to be mutually equal to each other.

From this state, when the brake pedal 10 is depressed, the brake ECU 6 controls the pressure decreasing valve 41 and the pressure increasing valve 42 based on the target servo pressure. In other words, the brake ECU 6 controls the pressure decreasing valve 41 to be in a closing side and controls the pressure increasing valve 42 to be in an opening side. When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By the increase of the pressure in the first pilot chamber 4D, the control piston 445 slidably moves towards the cylinder bottom surface side. Then the tip end of the projecting portion 445b of the control piston 445 is brought into contact with the ball valve 442 to close the passage 445d by the ball valve 442. Thus, the fluid communication between the second chamber 4B and the reservoir 171 is interrupted.

By further sliding movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through-passage 444a of the valve seat portion 444. As the highly pressurized operating fluid is supplied to the first chamber 4A from the accumulator 431, the hydraulic pressure in the second chamber 4B is also increased by the communication therebetween.

The brake ECU 6 controls the pressure increasing valve 42 and at the same time closes the pressure decreasing valve 41 so that the larger the displacement amount of the input piston 13 (operating amount of the brake pedal 10) detected by the stroke sensor 71, the higher the pilot pressure in the first pilot chamber 4D becomes. In other words, the larger the displacement amount of the input piston 13 (operating amount of the brake pedal 10), the higher the pilot pressure becomes and accordingly, the higher the servo pressure becomes. The servo pressure can be obtained from the pressure sensor 74 and can be converted into the pilot pressure.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the actuator 5, which will be explained later, and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the actuator 5 and a friction brake is operated to control brake operation of the vehicle. The force advancing the first master piston 14 forward under the "brake control" corresponds to a force corresponding to the servo pressure. When the brake operation is released, as opposite to the above, the pressure decreasing valve 41 is open and the pressure increasing valve 42 is closed to establish the fluid communication between the reservoir 171 and the first pilot chamber 4D. Then, the control piston 445 retreats and the vehicle returns to the state before depression of the brake pedal 10.

As stated above, the master cylinder 1 and the servo pressure generating device 4 include the first master piston 14 and the second master piston 15 which are driven by the force corresponding to the servo pressure and slidably move within the master cylinder 1, to thereby output the master pressure (hydraulic pressures in the first master chamber 1D and the second master chamber 1E) in response to the stroke of the first master piston 14 and the second master piston 15 to the wheel cylinders 541 through 544 by means of the actuator 5. The brake ECU 6 (corresponding to the control portion 61, which will be explained later) and the servo pressure generating device 4 correspond to the "first hydraulic pressure generating portion" which generates the servo pressure in response to the operation information obtained by the various sensors 71 through 73. The operation information (value relating to the operating amount) includes for example, the stroke obtained by the stroke sensor 71, the reaction force hydraulic pressure obtained by the pressure sensor 73 and/or the stroke per unit time (operating speed).

Further, a dead zone is set in the target servo pressure depending on the value of the target servo pressure. The dead zone has the same width at the positive side and the negative side with respect to the central value of the target servo pressure. The brake ECU 6 executes a hydraulic pressure control judging that the actual servo pressure (hydraulic pressure measured by the pressure sensor 74) has substantially reached the target servo pressure when the actual servo pressure enters within the dead zone area in the brake operation. In other words, when the actual servo pressure enters within the dead zone area, the brake ECU 6 executes the hydraulic pressure holding control which holds the servo pressure (pilot pressure).

(Movement Restriction Hydraulic Pressure Control)

Here, the movement restriction hydraulic pressure control which executes the brake control while restricting the movement of the sealing member Z2 will be explained. The brake ECU 6 has as a function, the control portion 61 which executes the brake control and the state judging portion 62. The control portion 61 executes the movement restriction hydraulic pressure control including the above brake control at a specific timing. The detail of the movement restriction hydraulic pressure control by the control portion 61 will be explained hereinafter.

The brake ECU 6 executes the movement restriction hydraulic pressure control after the sensor (pressure sensor 74) which detects the servo pressure or the sensor which can presume the servo pressure has completed the zero (0) point correction. The brake ECU 6 obtains the information whether or not the pressure sensor 74 has completed the zero point correction and recognizes that the zero point correction has completed. The zero point correction is performed for example, when the ignition switch is turned ON. The zero point correction may be performed every time when the vehicle stopping time passed a predetermined time. The zero point correction is performed at least one time before the movement restriction hydraulic pressure control is executed.

The state judging portion 62 judges whether or not the vehicle state is in a normal braking preliminary state and whether or not the vehicle state is in a sudden operation braking preliminary state. The normal braking preliminary state means the vehicle state that the brake pedal 10 is highly probably operated. The sudden operation braking preliminary state means the vehicle state that in addition to the state that the brake pedal 10 is highly probably operated, the speed of the brake pedal 10 operation speed becomes highly probably high. In concrete, the state judging portion 62 first judges whether the brake operation is being made or not based on the operation information obtained from the stroke sensor 71. When the stroke is zero, or the brake stop switch 72 indicates the OFF state (non-operation), the state judging portion 62 judges that the brake operation is not performed (Braking OFF state). Oppositely, when the stroke is greater than zero or the brake stop switch 72 indicates ON state (braking ON), the state judging portion 62 judges that the brake operation is being performed (Braking OFN state). Then, the state judging portion 62 judges that the vehicle state is in the "normal braking preliminary state", when the braking is in OFF state (brake operation is released) and the braking OFF state period of time is equal to or longer than a predetermined time period and at the same time the acceleration is in OFF state. For example, under the state that the brake pedal 10 operation has been released by the operator of the vehicle, if the operator operates the acceleration pedal 81 to advance or retreat the vehicle and after a predetermined time period of time passed, the acceleration pedal 81 is released (releases the foot from the acceleration pedal 81), the state judging portion 62 judges that the vehicle state is in the normal braking preliminary state upon release of the acceleration pedal 81. Whether the acceleration is OFF or not is judged based on the acceleration information (for example, stroke information of the acceleration pedal 81).

Further, the state judging portion 62 obtains the information on the shifting position (position information of the shift lever 82) and the ON/OFF information of the parking brake 83 by the vehicle communication (CAN). According to the embodiment, the shifting position information and the parking brake ON/OFF information may be considered to be a state information relating to the vehicle stopping. The state judging portion 62 judges that the vehicle state is in the "sudden operation braking preliminary state" when the brake operation is not performed, the shift lever 82 is in the P-range (parking position) and/or when the brake operation is not performed, the parking brake 83 is in ON state. Further, the state judging portion 62 may judge that the vehicle state is in the "sudden operation braking preliminary state", when the brake operation is not performed and at the same time the operation speed for releasing the acceleration pedal 81 is equal to or more than the predetermined value. In other words, the state judging portion 62 may judge that the vehicle state is in the sudden braking operation preliminary state, when the operation speed to the acceleration OFF is equal to or more than a predetermined value, or when the shift information indicates the P-range and/or when the ON/OFF information on the parking brake 83 indicates ON, under the premise that the brake operation is not performed. Judging of the normal braking preliminary state and the sudden operation braking preliminary state is made on the premise that the brake operation is not performed. As explained, the state judging portion 62 judges the vehicle state based on the operation information and the state information.

The control portion 61 executes the movement restriction hydraulic pressure control based on the judgement result of the state judging portion 62. The control portion 61 according to the embodiment executes the movement restriction hydraulic pressure control when the judging result of the state judging portion 62 indicates the normal braking preliminary state or the sudden operation braking preliminary state. The movement restriction hydraulic pressure control is a control in which when the operation information obtained from the stroke sensor 71 or the brake stop switch 72 indicates that "the brake pedal 10 is not operated", the servo pressure which is higher than the hydraulic pressure (reaction force hydraulic pressure) in the one side hydraulic pressure chamber 1B is generated in advance in the servo chamber 1A and consequently, the larger the value relating to the operating amount of the operation information obtained from the stroke sensor 71 and/or the pressure sensor 73 (values of stroke, operation force and/or operation speed), the more the high servo pressure is generated. In more concrete, according to the embodiment, when the vehicle state is judged to be in the normal braking preliminary state or the sudden operation braking preliminary state by the state judging portion 62, the movement restriction hydraulic pressure control increases the servo pressure in advance higher than the reaction force hydraulic pressure and under this state, consequently the brake control is executed in response to the brake operation. When the vehicle state is judged to be not any of the normal braking preliminary state and the sudden operation braking preliminary state, the control portion 61 does not execute the movement restriction hydraulic pressure control (stops the control) and executes a normal brake operation.

Figure 5:
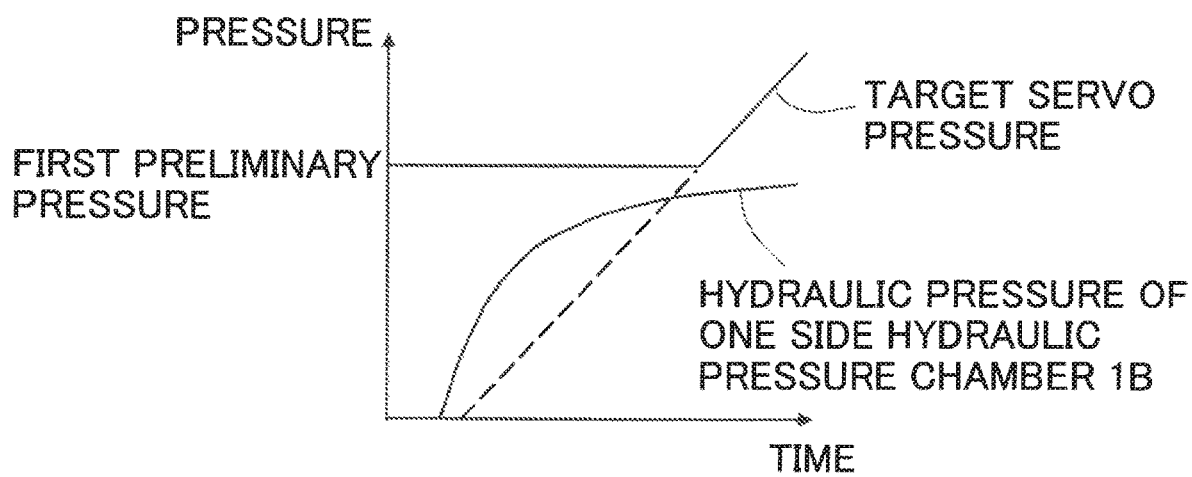
FIG. 5 is an explanatory view for explaining a movement restriction hydraulic pressure control according to the embodiment.

The control portion 61 sets the target servo pressure at a first preliminary pressure which is higher than the reaction force hydraulic pressure (in this embodiment, 0 MPa) when the vehicle state is judged to be in the normal braking preliminary state. The first preliminary pressure is set such that the servo pressure is always kept to a pressure higher than the reaction force hydraulic pressure (hydraulic pressure in the one side hydraulic pressure chamber 1B) which is variable depending on the operation speed of the brake pedal 10 which is an average, assuming speed, as shown in FIG. 5. For the purpose of reference, the change of the target servo pressure under normal brake operation is illustrated with a dotted line in FIG. 5. Further, the first preliminary pressure is set to the value that cannot advance the first master piston 14. In concrete, the first preliminary pressure is set such that the value of the first preliminary pressure (target servo pressure) added by the value worth of the dead zone width at the positive side (i.e., the upper limit value of the dead zone value) becomes less than the value of the set load of the master cylinder 1 (for example, the sliding resistance) divided by the pressure receiving area of the first master piston 14 (the area facing the servo chamber 1A). As explained, when the vehicle state is judged to be in the normal braking preliminary state by the state judging portion 62, the control portion 61 sets the target servo pressure at the first preliminary pressure and consequentially, the larger the stroke of the brake pedal, the higher the target servo pressure is raised.

Figure 6:
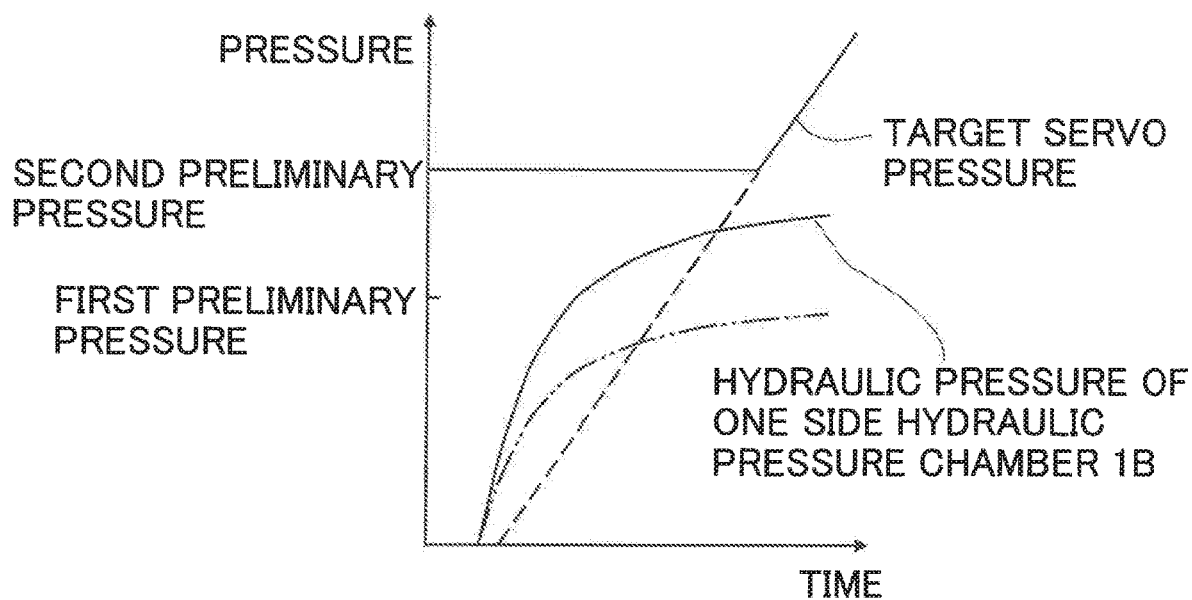
FIG. 6 is another explanatory view for explaining the movement restriction hydraulic pressure control according to the embodiment.

Further, the control portion 61 sets the target servo pressure at a second preliminary pressure which is higher than the reaction force hydraulic pressure (in this embodiment, 0 MPa) and at the same time higher than the first preliminary pressure when the vehicle state is judged to be in the normal braking preliminary state. The second preliminary pressure is set such that the servo pressure is always kept to a pressure higher than the reaction force hydraulic pressure which is variable depending on the sudden operation of the brake pedal 10 which is a sudden brake operation (highest operation speed) that can assume, as shown in FIG. 6. The second preliminary pressure is different from the setting of the first preliminary pressure, the highest value higher than the assumable maximum reaction force hydraulic pressure is set without considering the advance movement of the first master piston 14 by the second preliminary pressure. The second preliminary pressure according to the embodiment is set to the pressure value that is higher (i.e., the pressure value by which the first master piston 14 advances) than the maximum hydraulic pressure by which the first master piston 14 does not advance. As explained, when the vehicle state is judged to be in the sudden operation braking preliminary state by the state judging portion 62, the control portion 61 sets the target servo pressure at the second preliminary pressure and consequentially, the larger the stroke of the brake pedal, the higher the target servo pressure is raised.

Figure 7:
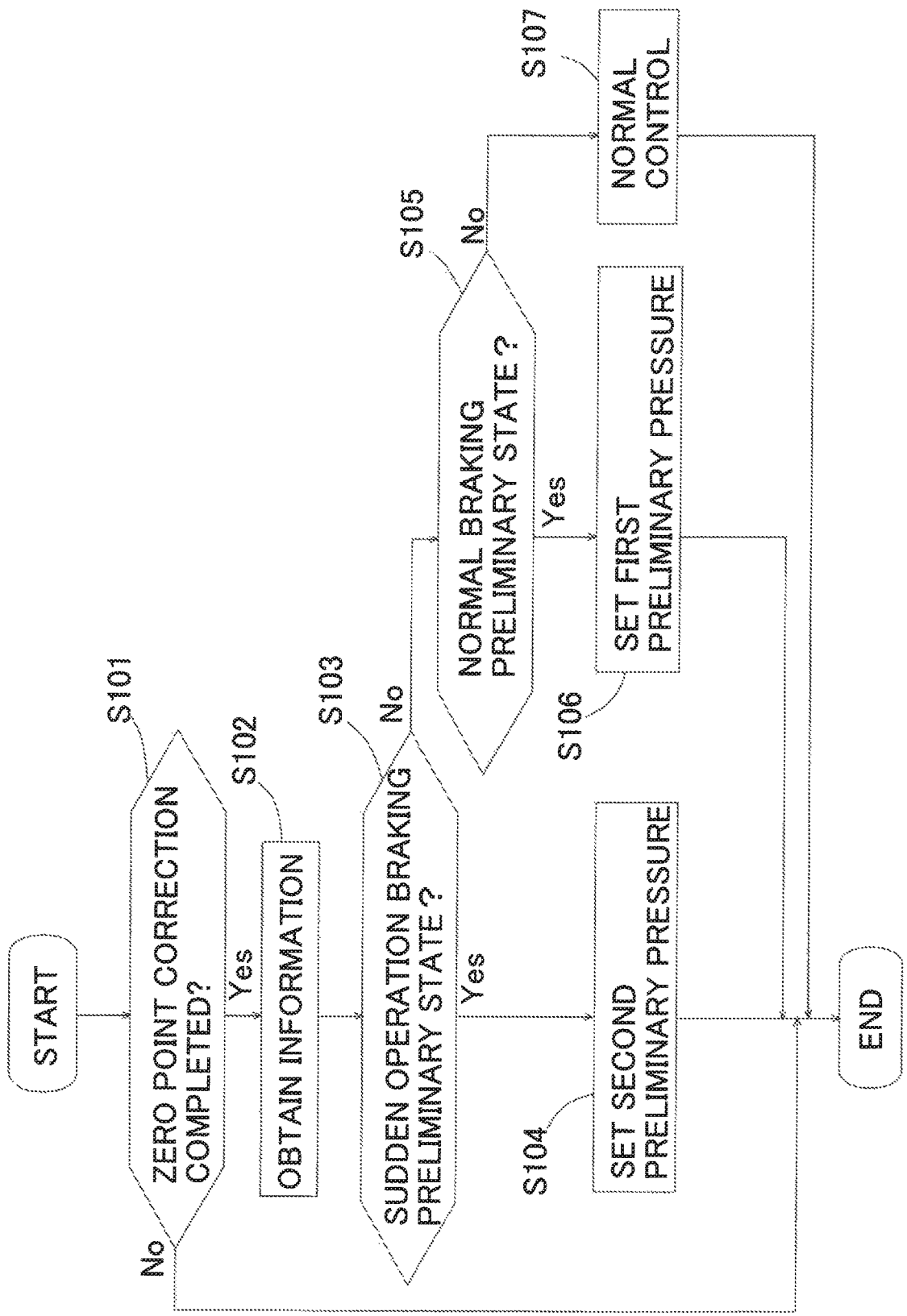
FIG. 7 is a flowchart for explaining the movement restriction hydraulic pressure control according to the embodiment.

One example of flow of the movement restriction hydraulic pressure control will be explained with reference to FIG. 7. The brake ECU 6 obtains the operation information (stroke, operation force and/or the operation speed) and the state information (shift information, ON/OFF information and/or acceleration information) (S102), after the completion of the zero point correction of the pressure sensor 74 (S101; Yes). Then, the state judging portion 62 judges whether the vehicle state is in the sudden operation braking preliminary state or not based on the obtained information (S103). When the vehicle state is judged to be in the sudden operation braking preliminary state (S103; Yes), the control portion 61 sets the target servo pressure at the second preliminary pressure so that the servo pressure becomes higher than the reaction force hydraulic pressure (S104).

On the other hand, when the vehicle state is judged to be not in the sudden operation braking preliminary state (S103; No), the state judging portion 62 judges whether the vehicle state is in the normal braking preliminary state or not (S105). When the vehicle state is judged to be in the normal braking preliminary state (S105; Yes), the control portion 61 sets the target servo pressure at the first preliminary pressure so that the servo pressure becomes higher than the reaction force hydraulic pressure (S106). When the vehicle state is judged to be not in the normal braking preliminary state (S105; No), the control portion 61 executes a normal braking control in which the target servo pressure is set in response to the brake operation (S107). The brake ECU 6 executes such movement restriction hydraulic pressure control every predetermined time.

(Operational Effects)

According to the embodiment, by executing the movement restriction hydraulic pressure control, the servo pressure becomes higher than the reaction force hydraulic pressure before brake operation is performed. Therefore, the sealing member Z2 moves towards the one side hydraulic pressure chamber 1B side in advance or the movement of the sealing member Z2 towards the servo chamber 1A side is prevented. Thus, by the movement restriction hydraulic pressure control, the servo pressure continues increasing in response to the magnitude of the brake operation and accordingly, the state that the sealing member Z2 is pressed towards the one side hydraulic pressure 1B side is kept for the continuing brake operation. In other words, according to the embodiment, the movement of the sealing member Z2 during the brake operation can be suppressed (movement of the sealing member Z2 towards the one side hydraulic pressure chamber 1B side after the movement towards the servo chamber 1A side can be suppressed). This can suppress the generation of the pedal shock.

Further, the faster the operation speed of the brake pedal 10 (depression speed), the higher the reaction force hydraulic pressure (hydraulic pressure in the one side hydraulic pressure chamber 1B) is likely to become. In other words, generally, the faster the operation speed, the higher the possibility of increasing of the reaction force hydraulic pressure higher than the servo pressure becomes during brake operation. However, according to the embodiment, by detecting the sudden operation braking preliminary state in which there is a high probability that the operation speed of the brake pedal 10 becomes high, the vehicular brake apparatus executes the movement restriction hydraulic pressure control when the vehicle state is in such sudden operation braking preliminary state. Accordingly, the movement restriction hydraulic pressure control can be executed at a more proper timing to suppress the generation of the pedal shock.

Further, the reaction force hydraulic pressure (hydraulic pressure in the one side hydraulic pressure chamber 1B) is likely to become high in the sudden operation braking preliminary state than in the normal braking preliminary state, due to the operation speed of the brake pedal 10 being likely to become fast. It is noted here that according to the movement restriction hydraulic pressure control according to the embodiment, the second preliminary pressure generated in the servo chamber 1A in the sudden operation braking preliminary state is set higher than the first preliminary pressure generated in the servo chamber 1A in the normal braking preliminary state. This can surely restrict the movement of the sealing member Z2.

For example, when the vehicle is stopped, the brake pedal 10 is likely to be depressed faster than in the case when the vehicle is travelling. Accordingly, the reaction force hydraulic pressure generated in the brake operation while the vehicle is stopped is likely to become high compared to the brake operation while the vehicle is travelling. The brake ECU 6 according to the embodiment detects the vehicle stopped state as the sudden operation braking preliminary state. Further, when the vehicle is in a stopped state, the movement restriction hydraulic pressure control in which the second preliminary pressure is added is executed and even the master pressure is generated by the advance movement of the first master piston 14 before the brake operation, normally the operator of the vehicle depresses the brake pedal 10 before starting the vehicle not to generate a dragging or failure in starting of the vehicle. Further, when the operator of the vehicle operates the parking brake 82 from ON to OFF, even the brake operation is not performed, a dragging by the parking brake 83 can be generated. Accordingly, when the operator of the vehicle operates the parking brake 82 from ON to OFF, any issue of generation of the master pressure by the movement restriction hydraulic pressure control does not arise. According to the embodiment, the movement restriction hydraulic pressure control is executed after completion of the zero point correction of the pressure sensor 74 to thereby suppress the dragging or a failure in starting the vehicle occurred due to errors.

(Others)

Figure 8:
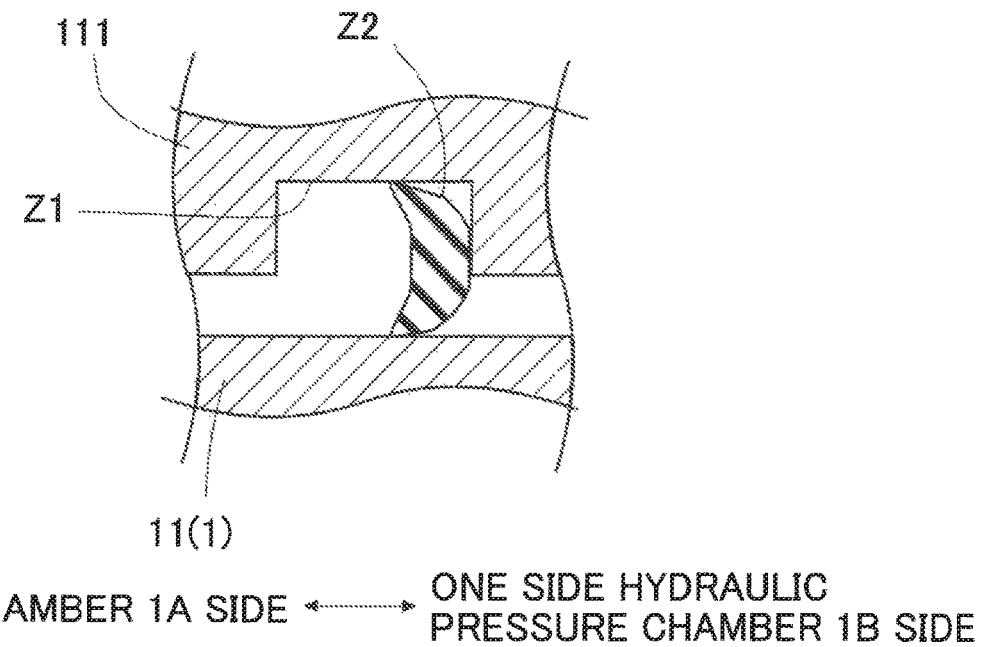
FIG. 8 is a conceptual view of a modified embodiment of the sealing member according to the embodiment.
Figure 9:
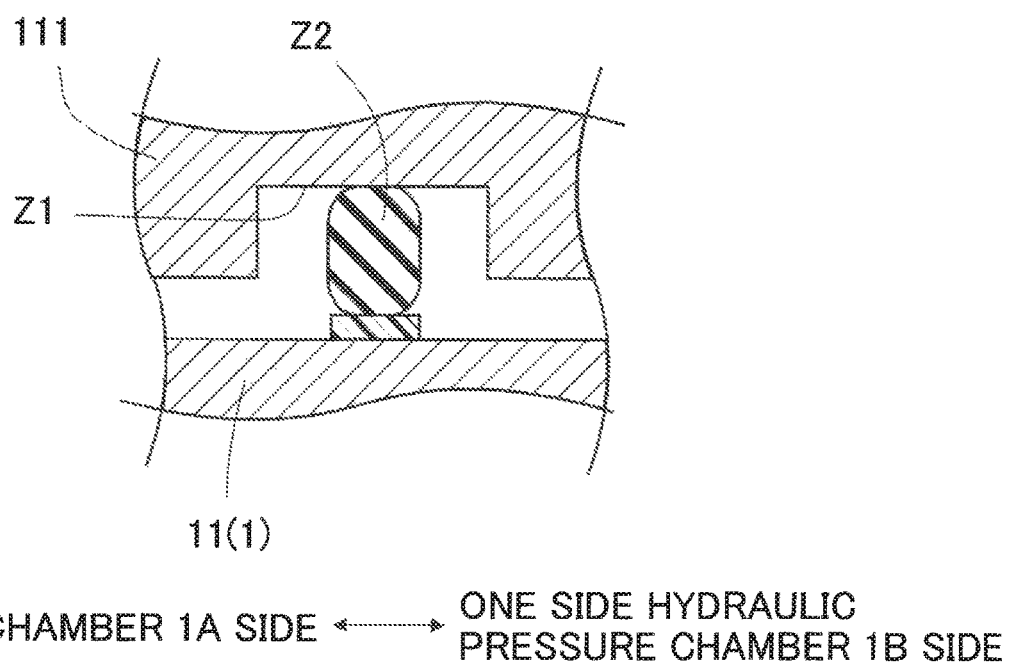
FIG. 9 is another conceptual view of a modified embodiment of the sealing member according to the embodiment.

The invention is not limited to the embodiment explained above. For example, a sealing material which deforms into a convex shape with the movement thereof as shown in FIG. 8 may be used for the sealing member Z2. The convex shape deformation means a deformation that the sealing member deforms into a convex shape towards the one side hydraulic pressure chamber 1B side under the state that the servo pressure is higher than the hydraulic pressure in the one side hydraulic pressure chamber 1B side and deforms into the convex shape towards the servo chamber 1A side under the state that the hydraulic pressure in the one side hydraulic pressure chamber 1B side is higher than the servo pressure. This deformation may occur in the sealing member according to the embodiment. The volume of the one side hydraulic pressure chamber 1B can be said to be variable by the convex shape deformation of the sealing member Z2. Accordingly, the invention is effective for the vehicular brake apparatus with the sealing member Z2 which moves and deforms into a convex shape. The type of the sealing member Z2 may be an O-ring type. Further, as shown in FIG. 9, the sealing member Z2 may be formed by an elastic member (for example, rubber material) which forms an inner peripheral side portion and a resin member which forms an outer peripheral side portion. According to thus formed sealing member Z2, keeping the sealing performance, the sliding resistance generated between the sealing member Z2 and the master cylinder 1 (main cylinder 11) can be reduced. Under such structure, the sealing member Z2 is likely to become more slidable, but according to the invention, such movement of the sealing member Z2 during the brake operation can be suppressed.

Further, regarding to the structure of servo pressure generation, the invention is not limited to the structure by the high pressure source and the electromagnetic valve, but the structure using an electric booster (for example, the system in which the regulator is operated by a motor) may be applicable. It is noted that the first preliminary pressure may be set to a value equal to or more than a pressure by which the sealing member Z2 is moved up to the rear end portion (end portion of the one side hydraulic pressure chamber 1B side) of a recessed portion Z1 of the sealing member Z2. The pressure can be presumable in advance by the simulation or the like. Thus, the movement of the sealing member Z2 during the brake operation can be surely suppressed. Further, the brake ECU 6 may judge that the "zero point correction has been completed" if the time elapsed after the completion of zero point correction is within a predetermined time period in the system that executes the zero point correction at a plurality of times. It is also noted that according to the vehicular brake apparatus which is equipped with a regeneration braking force generating device which generates the regeneration braking force at the wheels of the vehicle in addition to the hydraulic pressure generating device BF, when a switching control which switches the regeneration braking force to the hydraulic pressure braking force for a time period from the time when the vehicle speed drops to a predetermined speed until the time the vehicle stops, the servo pressure is shifted from the state that the servo pressure is lower than the reaction force hydraulic pressure to the state that the servo pressure is higher than the reaction force hydraulic pressure in response to the switching control. Then, the sealing member Z2 moves from the servo chamber 1A side to the one side hydraulic pressure chamber 1B side. However, by gradually executing the switching control from the regeneration braking force to the hydraulic pressure braking force, the pedal shock caused by the movement of the sealing member Z2 can be suppressed.

(Summary)

The vehicular brake apparatus according to the embodiment can be described as follows:

The vehicular brake apparatus according to the embodiment includes a hydraulic pressure output portion 1, 4 which includes a master cylinder 1 forming a first hydraulic pressure chamber 1A and a piston 14, 15 which is driven by a force corresponding to a first hydraulic pressure (servo pressure) which is a hydraulic pressure in the first hydraulic pressure chamber 1A to be slidably movable in the master cylinder 1, thereby to output an output hydraulic pressure (master pressure) which is a hydraulic pressure corresponding to a stroke of the piston 14, 15, an operation information obtaining portion 71 through 73, (6) which obtains an operation information relating to an operation of a brake operating member 10 and a first hydraulic pressure generating portion 4, 61 which generates the first hydraulic pressure in response to the operation information obtained by the operation information obtaining portion 71 through 73, (6), wherein a braking force is generated at a wheel of a vehicle based on the output hydraulic pressure. The master cylinder 1 forms a second hydraulic pressure chamber 1B neighboring to the first hydraulic pressure chamber 1A through a sealing member Z2 and the sealing member is arranged at a position facing the first hydraulic pressure chamber 1A and the second hydraulic pressure chamber 1B to be movable in an axial direction relative to the master cylinder 1. The second hydraulic pressure chamber 1B is configured such that a second hydraulic pressure (reaction force hydraulic pressure) which is a hydraulic pressure in the second hydraulic pressure chamber 1B is mechanically increased or decreased in response to the operation of the brake operating member 10 and at the same time a force corresponding to the second hydraulic pressure acts on the brake operating member 10 and the first hydraulic pressure generating portion 4, 61 executes a movement restriction hydraulic pressure control such that when the operation information obtained by the operation information obtaining portion 71 through 73, (6) indicates that the brake operating member 10 is not operated, the first hydraulic pressure which is higher than the second hydraulic pressure is generated in advance and consecutively, the larger a value relating to an operating amount in the operation information obtained by the operation information obtaining portion 71 through 73, (6), the higher the first hydraulic pressure is generated.

Further, according to the vehicular brake apparatus of the embodiment further includes a state judging portion 62 which judges whether or not a vehicle state is in a sudden operation braking preliminary state in which a probability that an operation speed of an operation of the brake operating member 10 becomes high is high, wherein the first hydraulic pressure generating portion 4, 61 executes the movement restriction hydraulic pressure control when the vehicle state is judged to be in the sudden operation braking preliminary state by the state judging portion 62.

Further, the first hydraulic pressure generating portion 4, 61 generates the first hydraulic pressure in the first hydraulic pressure chamber 1A in advance in the movement restriction hydraulic pressure control executed when the vehicle state is judged to be in the sudden operation braking preliminary state by the state judging portion 62, the first hydraulic pressure (the second preliminary pressure) being higher than the first hydraulic pressure (the first preliminary pressure) generated in the first hydraulic pressure chamber 1A in advance in the movement restriction hydraulic pressure control executed when the vehicle state is not judged to be in the sudden operation braking preliminary state by the state judging portion 62.

REFERENCE SIGNS LIST

1; master cylinder (hydraulic pressure output portion), 11; main cylinder, 12; cover cylinder 13; input piston, 14; first master piston (piston), 15; second master piston (piston), 1A; servo chamber (first hydraulic pressure chamber), 1B; one side hydraulic pressure chamber, 1C; other side hydraulic pressure chamber, 1D; first master chamber, 1E; second master chamber, 10; brake pedal (brake operating member), 171; reservoir, 2; reaction force generating device, 22; first control valve, 23; second control valve, 4; servo pressure generating device, (hydraulic pressure output portion, first hydraulic pressure generating portion), 41; pressure decreasing valve, 42; pressure increasing valve, 431; accumulator, 44; regulator, 445; control piston, 4D; first pilot chamber, 5; actuator, 531; holding valve, 532; pressure decreasing valve, 533; reservoir, 541, 542, 543, 544; wheel cylinder, 5FR, 5FL, 5RR and 5RL; wheel, BF; hydraulic pressure braking force generating device, 6; brake ECU, 61; control portion (first hydraulic pressure generating portion), 62; state judging portion, 71; stroke sensor (operation information obtaining portion), 72; brake stop switch, 73, 74, 75; pressure sensor, 76; wheel speed sensor, 81; acceleration pedal, 82; shift lever, 83; parking brake, Z1; recessed portion, Z2; sealing member.

The invention claimed is:

1. A vehicular brake apparatus comprising:
a hydraulic pressure output portion which includes a master cylinder forming a first hydraulic pressure chamber and a piston which is driven by a force corresponding to a first hydraulic pressure which is a hydraulic pressure in the first hydraulic pressure chamber to be slidably movable in the master cylinder, thereby to output an output hydraulic pressure which is a hydraulic pressure corresponding to a stroke of the piston;
an operation information obtaining portion which obtains an operation information relating to an operation of a brake operating member; and
a first hydraulic pressure generating portion which generates the first hydraulic pressure in response to the operation information obtained by the operation information obtaining portion, wherein a braking force is generated at a wheel of a vehicle based on the output hydraulic pressure, wherein
the master cylinder forms a second hydraulic pressure chamber neighboring to the first hydraulic pressure chamber through a sealing member;
the sealing member is arranged at a position facing the first hydraulic pressure chamber and the second hydraulic pressure chamber to be movable in an axial direction relative to the master cylinder;
the second hydraulic pressure chamber is configured such that a second hydraulic pressure which is a hydraulic pressure in the second hydraulic pressure chamber is mechanically increased or decreased in response to the operation of the brake operating member and at the same time a force corresponding to the second hydraulic pressure acts on the brake operating member; and
the first hydraulic pressure generating portion executes a movement restriction hydraulic pressure control such that when the operation information obtained by the operation information obtaining portion indicates that the brake operating member is not operated, the first hydraulic pressure which is higher than the second hydraulic pressure is generated in advance and consecutively, the larger a value relating to an operating amount in the operation information obtained by the operation information obtaining portion, the higher the first hydraulic pressure is generated.

2. The vehicular brake apparatus according to claim 1, further comprising:
a state judging portion which judges whether or not a vehicle state is in a sudden operation braking preliminary state in which a probability that an operation speed of an operation of the brake operating member becomes high is high, wherein
the first hydraulic pressure generating portion executes the movement restriction hydraulic pressure control when the vehicle state is judged to be in the sudden operation braking preliminary state by the state judging portion.

3. The vehicular brake apparatus according to claim 2, wherein
the movement restriction hydraulic pressure control, the first hydraulic pressure generated in the first hydraulic pressure chamber in advance when the vehicle state is judged to be in the sudden operation braking preliminary state by the state judging portion is higher than the first hydraulic pressure generated in the first hydraulic pressure chamber in advance when the vehicle state is not judged to be in the sudden operation braking preliminary state by the state judging portion.

4. The vehicular brake apparatus according to claim 3, wherein in the movement restriction hydraulic pressure control, when the vehicle state is not judged to be in the sudden operation braking preliminary state by the state judging portion, the first hydraulic pressure generated in the first hydraulic pressure chamber in advance is set to a value that cannot advance the piston.

* * * * *